United States Patent
Abaunza et al.

[11] Patent Number: 5,772,153
[45] Date of Patent: Jun. 30, 1998

[54] AIRCRAFT ICING SENSORS

[76] Inventors: John T. Abaunza, 12619 Camden Dr., Goldvein, Va. 22720; Nicholas C. Donnangelo, 104 Cornwall St., NE., Leesburg, Va. 22075

[21] Appl. No.: 544,131

[22] Filed: Oct. 17, 1995

[51] Int. Cl.$^6$ ................................................ B64D 15/20
[52] U.S. Cl. ...................... 244/134 F; 340/581; 73/627; 73/861.04
[58] Field of Search .......................... 244/134 R, 134 F, 244/134 D; 340/580, 582; 73/627, 599, 861.04; 324/331, 635, 644

[56] References Cited

U.S. PATENT DOCUMENTS

| | | |
|---|---|---|
| 2,355,014 | 8/1944 | Schorn . |
| 2,359,787 | 10/1944 | Peters et al. . |
| 2,432,669 | 12/1947 | Kliever . |
| 3,540,025 | 11/1970 | Levin et al. . |
| 3,882,381 | 5/1975 | Gregory ................................... 340/580 |
| 4,054,255 | 10/1977 | Magenheim . |
| 4,628,736 | 12/1986 | Kirby et al. ............................. 340/582 |
| 4,688,185 | 8/1987 | Magenheim et al. . |
| 4,766,369 | 8/1988 | Weinstein . |
| 4,782,331 | 11/1988 | Martens . |
| 4,797,660 | 1/1989 | Rein, Jr. . |
| 4,803,470 | 2/1989 | Fineman . |
| 4,851,817 | 7/1989 | Brossia et al. . |
| 4,891,796 | 1/1990 | Sekine ..................................... 340/582 |
| 5,005,015 | 4/1991 | Dehn et al. . |
| 5,072,172 | 12/1991 | Stolarczyk et al. ...................... 324/332 |
| 5,134,380 | 7/1992 | Jonas . |
| 5,381,694 | 1/1995 | Glynn et al. .............................. 73/627 |
| 5,467,944 | 11/1995 | Luukkala ............................. 244/134 F |
| 5,474,261 | 12/1995 | Stolarczyk et al. .................. 244/134 F |
| 5,585,551 | 12/1996 | Johansson et al. ...................... 340/582 |

FOREIGN PATENT DOCUMENTS

| | | |
|---|---|---|
| 2707009 | 8/1978 | Germany . |
| 938005 | 6/1982 | Russian Federation . |

*Primary Examiner*—Galen L. Barefoot

[57] ABSTRACT

An icing sensor utilizes a surface gap transmission line along which a radio frequency is transmitted. The phase delay of the radio frequency along the transmission line is dependent upon the dielectric constant presented at the surface in the gap between the transmission line electrodes. Accordingly, changes of dielectric constant affect phase delay of the transmitted frequency. This phase delay may be used to detect the difference between ice, water and snow as well as the presence of freezing point depressing fluids such as ethylene glycol. When the sensor is mounted on an aircraft control surface, the presence and likelihood of icing conditions may be predicted. Through the use of one or more temperature, freezing point depressing fluids/water mixture determined from dielectric constant, and rate of change of the dielectric constant, it is possible to predict the time delay until icing begins. Thus, the sensor of the present application may safely reduce the effort and expense in aircraft deicing.

40 Claims, 6 Drawing Sheets

AIRCRAFT ICING SENSORS

FIELD OF THE INVENTION

The invention generally relates to the detection of the constitution or state of a substance such as water, and more specifically to the detection of ice on a surface of an airplane.

BACKGROUND OF THE INVENTION

The detection of ice on the wing surface of an airplane is important in order that corrective measures may be taken to allow the airplane safely to fly.

On Sep. 25, 1992 the Federal Aviation Administration enacted new rules for improving airline flight safety in ground-icing conditions. The rules require that air carrier operators adopt stringent controls for training personnel in the proper detection and removal of airframe icing and how long a departing aircraft can wait between deicing/anti-icing and takeoff.

According to the National Transportation Safety Board, 16 takeoff accidents involving major air carriers have been attributed to ground airframe icing worldwide over the last 23 years[1]. Seven of the 15 accidents involved large U.S. transport aircraft[2]. According to the National Transportation Safety Board, over 100 incidents involving corporate, business and regional airline/commuter aircraft have been linked to ground icing.

[1] The first crash involving a major air carrier attributed to ground icing involved a DC-9. The Ozark Air Lines aircraft crashed shortly after takeoff at Sioux City, Iowa on Dec. 27, 1968, killing all aboard.

[2] The more recent incident attributed to ground icing involved the crash of a Fokker F28 aircraft on Mar. 22, 1992. Immediately after takeoff the plane careened into the runway, and tumbling over an embankment, plunged into the frigid waters of Flushing Bay. Twenty-seven people were killed.

One segment of the new FAA rules requires direct inspection of critical aircraft surfaces (i.e., wing and tail). Given the unavailability of reliable sensors for measuring the accumulation of freezing precipitation and other forms of ground icing, the direct inspection usually requires clear visual or tactile inspection. Operators claim that the rule is unworkable, requiring ladders or scaffolds for personnel to run their hands over the critical wing and tail surfaces before takeoff. Also there exists potential for aircraft damage and personal injury due to scaling ladders in icing conditions and contact with hazardous deicing chemicals.

In addition to tactile confirmation of a "clean" wing, i.e., free of frost or ice contamination, aircraft operators also face new controls on how long aircraft can wait to takeoff after having received an application of freezing point depression fluid. The newly adopted rules prohibit take off with any snow, ice or frost on any aerodynamic surfaces[3]. The only substances FAA officials allow on the wing or tail surfaces of an aircraft departing in ground icing conditions are freezing point depressing (FDP) fluids. As a result of the "clean wing" provision, the airlines and other aircraft operators are forced to apply FPD more frequently.

[3] Previous FAA rules allowed takeoff provided that snow, ice or frost had not "adhered" to the wing surface.

However, the determination of the frequency of FDP fluid application still depends substantially upon the pilot's perception of how quickly the freezing precipitation is falling, and how quickly it may be diluting the FDP fluid on the aircraft. Holdover times range from 2 minutes to 1 hour and 15 minutes, based on the pilot's subjective determination.

Ethylene glycol and propylene glycol, key components of all aviation approved FPD fluids, are classified as hazardous substances under U.S. law.

Airports must handle these fluids after they wash off the aircraft. The cost and environmental problems involved in handling commercial quantities of hazardous FPD fluids are significant. Ethylene glycol and propylene glycol consume large amounts of oxygen when they biodegrade. Large releases could disable sewage treatment facilities, kill wildlife and domestic animals (who are attracted by the sweet taste of glycols), and marine life in the waterways. With enactment of the FAA's new "clean wing" rules, and the expected substantial increase in FPD fluid utilization, airports have few options. Several airport facilities pay municipal sewage treatment plants to take their used glycol, but the material must be metered into the plant at a significant increase in airline operator user fees and ultimately, passenger ticket prices.

Because of the hazard and expense of such deicing operations, it is desirable to minimize unnecessary FPD fluid application. But without an objective measure of glycol concentration or ice buildup on the aerodynamic surfaces, minimizing the application of FDP fluids means significantly greater risk to aircraft safety.

Several systems have been proposed to detect ice. However, each of these systems has one or more disadvantages which has prevented its commercial use to detect grounded in flight aerodynamic aircraft surface icing.

U.S. Pat. No. 4,688,185 to Magenheim et al. discloses an ice measurement instrument which includes a waveguide operating in a transmission mode, passing energy from an input port to an output port. Energy is applied to the input port with a sweeping frequency. The resonant frequency of the waveguide depends on the presence and/or thickness of ice, and thus detected peaks in transmitted energy received at the output port, corresponding to a resonant frequency, are used to determine ice thickness. In order to minimally disturb the airflow around the wing, the waveguide is made flush with the wing. However, the reliance of the device on the detection of a resonant frequency results in making determinations of icing as a function of a single data point (the resonant frequency) or alternatively at multiple data points. Also, since the waveguide is bulky, extensive modification or construction to the surface of the wing is necessary.

OBJECTS AND SUMMARY OF THE INVENTION

It is an object of the present invention to provide a substance detection system which enables the detection of a substance or its state in an inexpensive and reliable manner.

It is another object of the invention to provide a system and method for detection of ice, water, glycols (or other FPDs) and air on the surface of an aircraft easily, inexpensively and reliably.

It is a further object of the present invention to develop an ice sensor which may be installed on the control and aerodynamic surfaces of an aircraft without substantial reconstruction or redesign thereof.

It is a further object of the invention to enable aircraft icing inspection without impractical tactile inspection of the wing and tail surfaces.

It is a further object to reduce the unnecessary release of hazardous glycols into the environment by avoiding unnecessary deicings and by allowing objective evaluation of how long the deicing process is effective.

It is a still further object of the present invention to predict when icing of a surface will occur so as to better predict when freezing point depressing fluids need to be applied, as well as the amount to be applied, thereby increasing the efficiency of the ice removal operation and FPD fluid runoff.

It is another object of the present invention to detect such icing conditions in other applications, such as on highway bridges and electrical transmission lines.

It is a still another object of the present invention to generally identify materials or the states, or the quantity thereof based, in part, on the propagation delay of the sensed material.

In one embodiment of the invention, these objects are obtained by providing a system for detecting the presence of icing on a surface comprising:

a surface mounted surface gap transmission line having first and second ends;

a radio frequency source, operatively connected to a first end of said surface mounted surface gap transmission line, and supplying a radio frequency thereto;

a detector, operatively connected to said second end of said surface mounted surface gap transmission line, and detecting the propagation delay of said radio frequency down said surface mounted surface gap transmission line; and means for determining the presence of icing from the propagation delay detected by said detector.

The icing sensor produced according to the teachings of the present invention is particularly useful for detecting the presence of icing on aircraft control surfaces. For example, one embodiment of the invention comprises an array of flush mounted sensors, linked to a cockpit mounted pilot interface and computing unit. Each sensor utilizes a surface gap transmission line or micro-strip transmission line which is mounted to a surface to be monitored.

Radio frequency energy (pulse or continuous wave) is transmitted down the transmission line and the time delay caused by the transmission link is monitored. This time delay is closely related to the dielectric constant of the material contacting the surface gap of the transmission line. Accordingly, the dielectric constant of the material contacting the transmission line may be derived.

The dielectric constants of ice and water dramatically differ. Accordingly, the presence of icing may be detected by the sensor. Similarly, the presence of glycol (the primary constituent of freezing point depressing fluids) has a dielectric constant substantially different from that of ice and water and accordingly may also be detected, thereby enabling the evaluation of the status of the surface and its likelihood of freezing under present conditions. This is particularly important in assuring that aerodynamic surfaces are free of ice contamination prior to take-off and to detect the accretion of ice during flight in conditions susceptible to icing.

The benefits of the invention will be understood by one of ordinary skill in the art by the detailed description of examples given below.

DETAILED DESCRIPTION OF PREFERRED EMBODIMENTS

Figure 1:
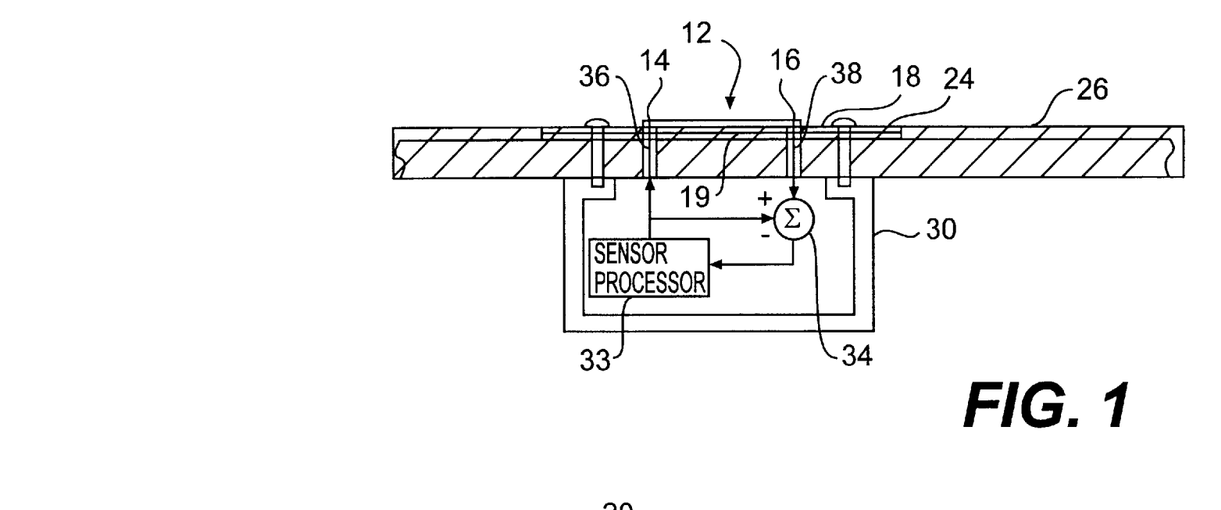
FIG. 1 is a schematic side view illustrating a surface mounted surface gap transmission line used to determine the dielectric constant of a substance contacting the transmission line based on transmission line induced phase delay, thereby detecting icing.
Figure 2:
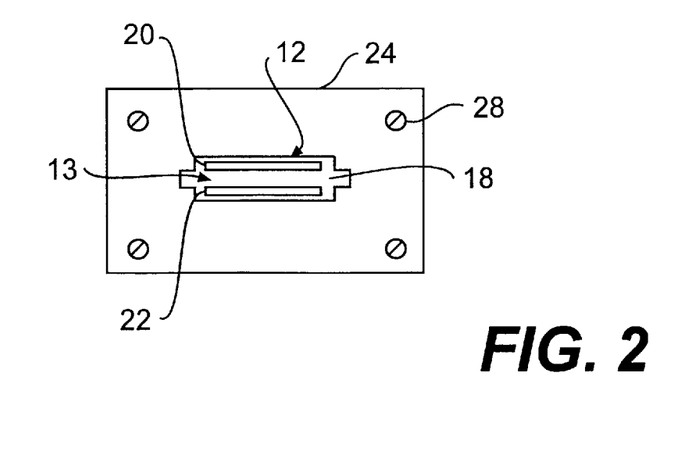
FIG. 2 is a schematic top view of the surface mount surface gap transmission line of FIG. 1.

FIGS. 1 and 2 schematically illustrate one preferred embodiment of the present invention. A feature of the teachings of the present application is the use of a slot-type transmission line 12 having first and second transmission line electrodes 20, 22 separated with a surface gap 13 and overlying an insulated substrate 18 which, in turn, separates the first and second transmission line electrodes from a conducting plane 19.

The surface gap 13 comprises the sensing area according to the teachings of the present application. In the preferred embodiment, the slot-type transmission line 12 is manufactured on the insulated substrate 18 using conventional printed circuit board etching techniques. The insulator substrate 18 with integrally formed first and second transmission line electrodes 20, 22 and conducting plane 19 is mounted to a surface mount plate 24 which is preferably flush mounted into a surface to be monitored 26 using one of more rivets, screws or the like 28. Alternatively, in a less hostile environment or where no surface is present, the slot-type transmission line may be exposed directly to a substance to be monitored without use of any support surface.

In the embodiment of FIGS. 1 and 2, the sensor electronics including a sensor processor 32 and phase detector 34 locally provided in a housing 30 mounted directly beneath the surface to be monitored. The sensor processor 32 generates a radio frequency signal which is supplied to a first end 14 of the slot-type transmission line 12 via first conductors 26. Simultaneously, the radio frequency is supplied to a phase detector 34 which is also connected to a second end 16 of the slot-type transmission line 12 via conductor 38.

The phase detector 34 determines the phase difference between the radio frequency produced by the sensor processor 32 and the radio frequency received from the second end 16 of the transmission line 12 and produces a phase difference which is used to determine the identity of the substance presented to the slot type transmission line 12 whose gap 13 functions as the sensing area.

Figure 3:
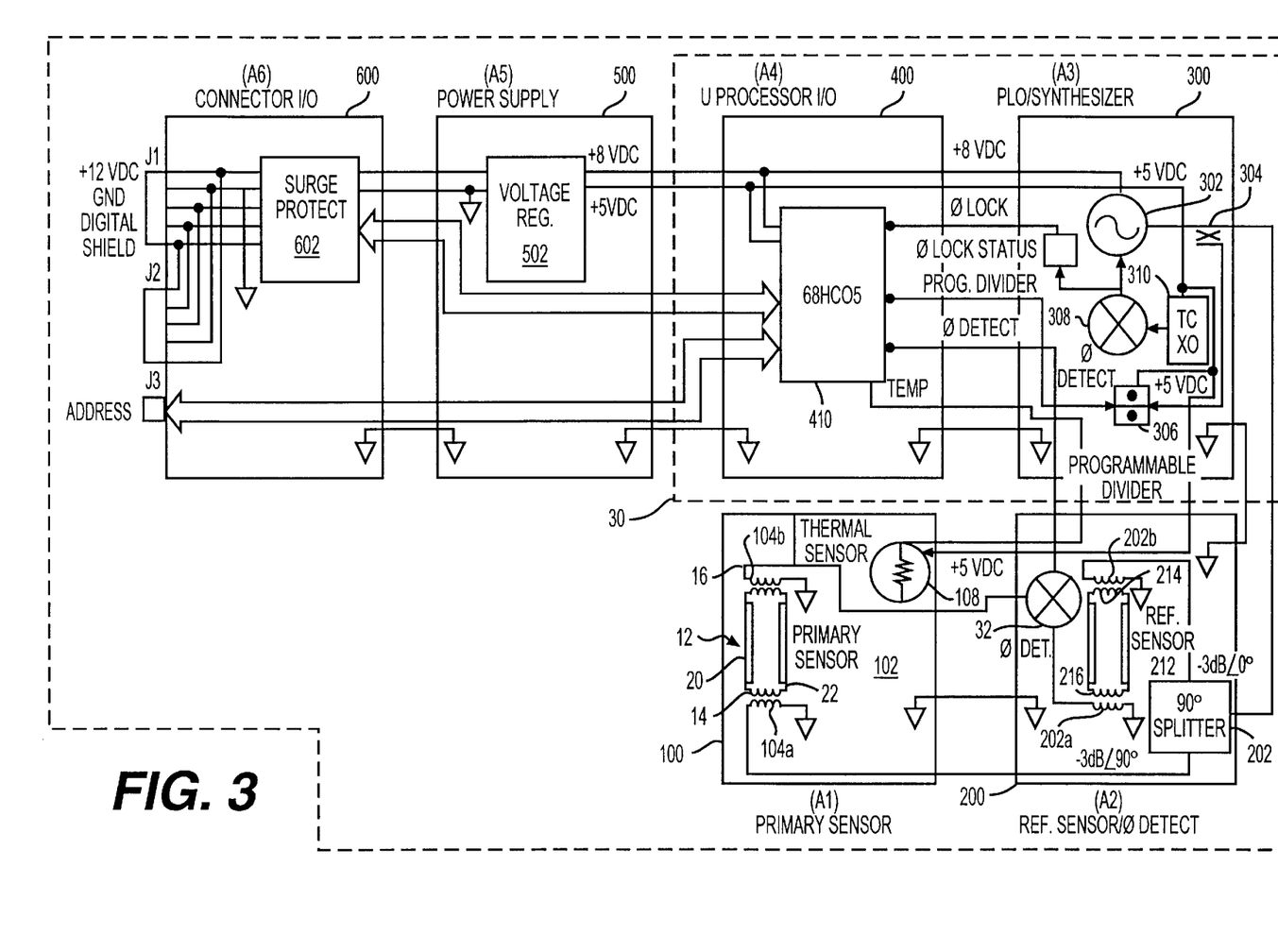
FIG. 3 is a schematic circuit diagram of one embodiment of an icing detection sensor produced according to the teachings of the present application.

FIG. 3 is a more detailed schematic illustrating the circuitry used in the sensing system of the present application. In this more detailed embodiment, the phase delay of the slot-type transmission line 12 which forms a primary sensor 102 of a primary sensor assembly 100 is compared to a phase delay produced from a substantially identical slot-type transmission line 212 which is environmentally protected within the housing 30. The primary sensor assembly 100 further includes a thermal sensor 108 which may be of any suitable type including a simple resistor sensor or thermocouple as would occur to one of ordinary skill in the art. The thermal sensor is connected to a microprocessor assembly 400 and is, in the aviation embodiment, preferably selected to be particularly accurate at conditions at or near freezing.

The reference sensor 212 is provided within a reference sensor/phase detector assembly 200 of the circuitry of FIG. 3. The primary sensor 22 is coupled to the remaining circuitry through the use of first and second balanced to unbalanced transformers, or Baluns 104a,b. The reference sensor 212 is coupled to the remaining circuitry through the use of third and fourth balanced to unbalanced transformers or Baluns 202a,b. A phase lock oscillator/synthesizer assembly 300 is connected to the reference sensor phase detector 200 and also to a microprocessor assembly 400.

The phase lock oscillator/synthesizer assembly 300 produces a reference radio frequency at the output of an oscillator 302. A splitter 304 is used to divide the radio frequency signal from the reference oscillator 302 into first and second radio frequency signals having a known phase relationship, preferably over the radio frequency range of the oscillator. In the preferred embodiment, the phase difference for dry air is selected to be −90° degrees, providing a possible phase delay range to +90° degrees.

The first radio frequency signal is fed back into a programmable divider 306 which is programmed under control of the microprocessor assembly 400. The output of the programmable divider 306 is provided to a synthesizer mixer assembly 308 which also receives the output of a temperature stabilized crystal oscillator 310. The output of the synthesizer 308 is provided to the synthesizer oscillator 302 to lock the oscillation frequency to a desired frequency under control of the microprocessor assembly 400 in a manner which is well known.

The radio frequency signal 304 provided from the output of the synthesizer oscillator 302 is provided to a radio frequency signal splitter 202. Identical radio frequency signals are applied to first ends of the slot-type transmission line 12 of the primary sensor 100 and the slot-type transmission line 212 of the reference sensor 200. The second ends 16, 216 of the primary slot transmission line 12 and reference slot-type transmission line 212, respectively, are supplied to the phase detector 32 within the reference sensor/phase detector assembly 200. The output of the phase detector is supplied to the microprocessor 410.

The dielectric coefficients of the principal materials encountered on an aircraft control surface are sufficiently distinct from each other, enabling reliable detection of pre-flight ice, snow, water and freezing point depressing fluids. It is accordingly possible to identify the type of substance on the aircraft surface. Further, the rate of change of dielectric signals the transmission of water or a water-freezing point depressing fluid mixture to ice. This rate of change allows prediction of the time delay until icing begins, which time delay can be determined empirically and programmed into the microprocessor 410 or alternatively, may be calculated. The time until icing may also be calculated through a calculation of temperature and the relative mixture of freezing point depression fluid to water which relative mixture may be calculated by the dielectric constant of the material or known and preprogrammed into the system. These parameters may also be used to predict the time to the initiation of icing. Accordingly, the system of the present application, through operation of the microprocessor 410 under control suitable programming as outlined above, may predict a time delay until icing will occur.

FIG. 3 further illustrates a regulated power supply assembly 500 including a voltage regulator 502 which provides properly filtered and regulated voltages and a connection assembly 600 including a surge protector 602, data connectors J1, J2, and an address jumper J3. The address jumper J3 is jumpered to form a unique binary code recognized by the microprocessor 410 and uniquely identifying each ice sensor within the overall system as illustrated in FIG. 4.

Figure 4:
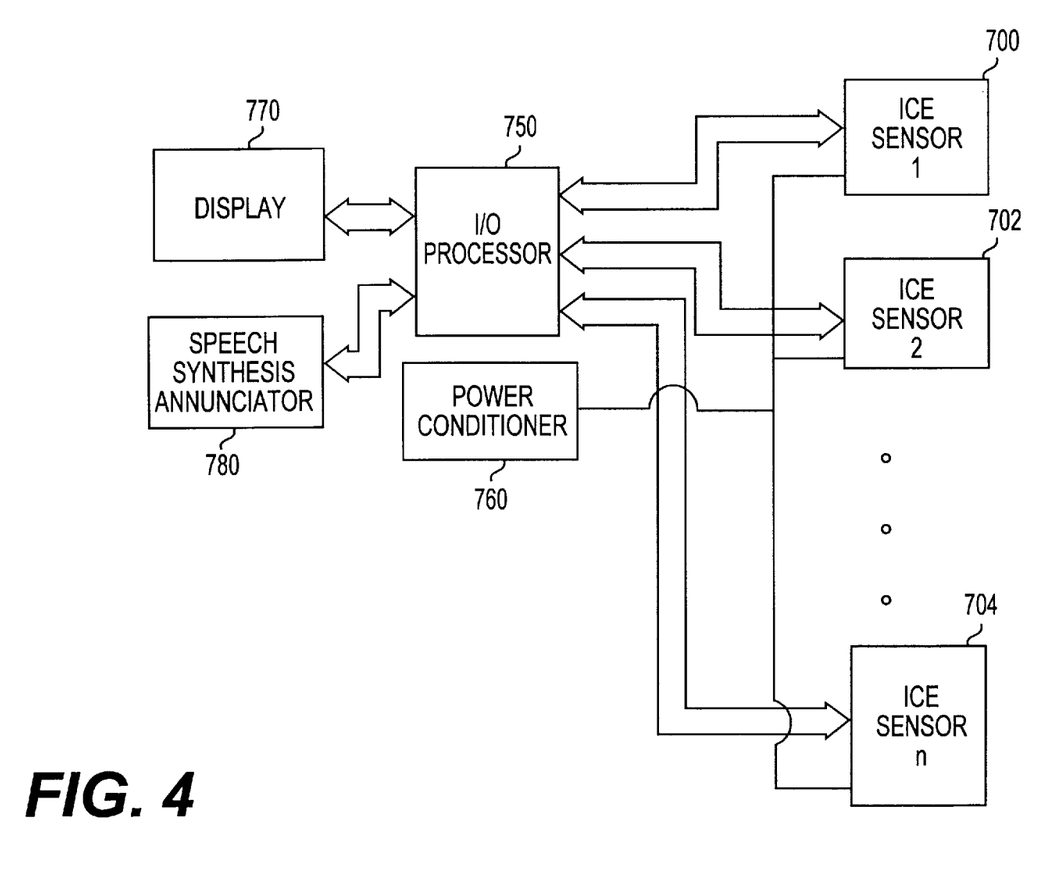
FIG. 4 is a schematic illustration of the assemblage of a plurality of icing sensors as schematically illustrated in FIGS. 1–3, to assemble information to provide an operator with a single display evaluating the icing potential on all control surfaces of an aircraft.

FIG. 4 illustrates a plurality of ice sensors 700, 702, 704 connected to a central input/output processor 750, power conditioner 760, display 770 and a speech synthesis annunciator 780. As can be seen in FIG. 4, the preferred embodiment of the present application contemplates the use of a plurality of ice sensors communicating to the user through a single I/O processor 750. Each of these ice sensors corresponds to the circuitry illustrated in FIG. 3 which is able to independently sense the presence of ice. Alternatively, these sensors may be designed to detect the state or presence of any substance identifiable through variations in transmission line time delay resulting from differences in dielectric constant.

According to the teachings of the present application, the ice sensors may be connected to the I/O processor 750 in any suitable fashion. In one embodiment of the present invention, the sensors may be "daisy chained" together, connecting some or all of the ice sensors using a single data cable employing bi-directional, differential TTL logic employing any suitable packet protocol. Alternatively, as shown in FIG. 4, the ice sensors may be individually connected to the I/O processor.

The I/O processor monitors the inputs of each of the 1-N ice sensors which are each capable independently determining the presence of ice or other substances. The I/O processor will audibly and visibly display to the operator the condition of each of the surfaces upon which one of the ice sensors 1-N are disposed. For example, if ice sensor 1 is disposed on the left wing of an aircraft, upon detecting the presence of ice the ice sensor 1, the I/O processor might display and/or audibly announce "ICE-LEFT WING SURFACE". Thus, the operator is advised, not only of the presence of ice, but also its location. This is particularly useful for aircraft pilots as it facilitates quick and efficient deicing of the appropriate surface. Desirably the 1-N ice sensors are distributed across the aerodynamic and control surfaces of the aircraft so that any ice accumulation can be quickly detected and located.

Figure 5A:
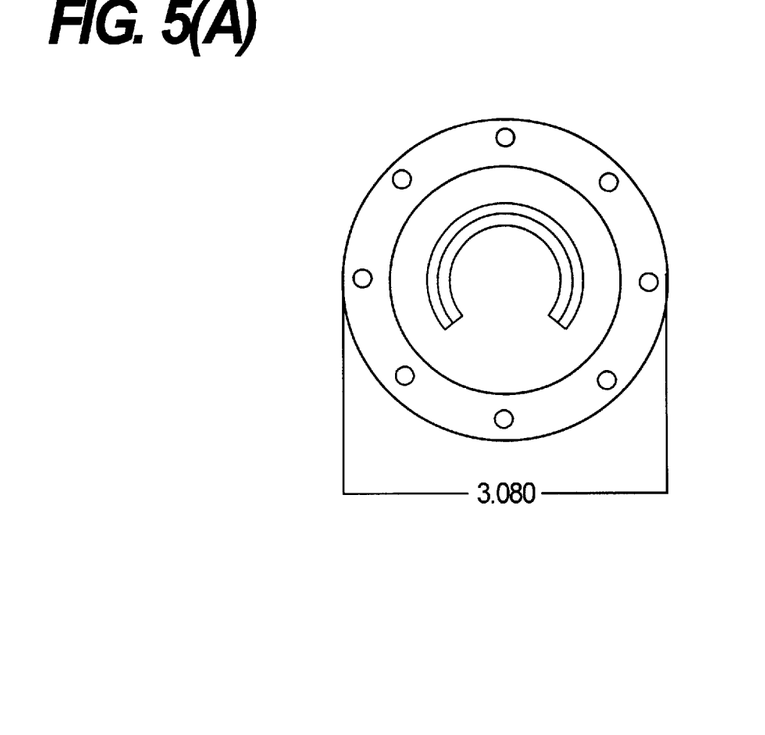
FIG. 5(A) and 5(B) are, respectively top and side views of one embodiment of the sensor of the present invention as housed for installation.
Figure 5B:
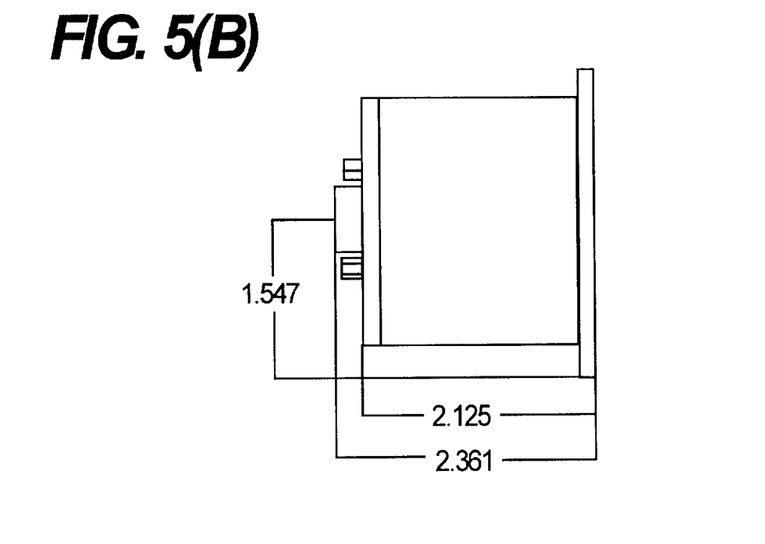
Figure 6:
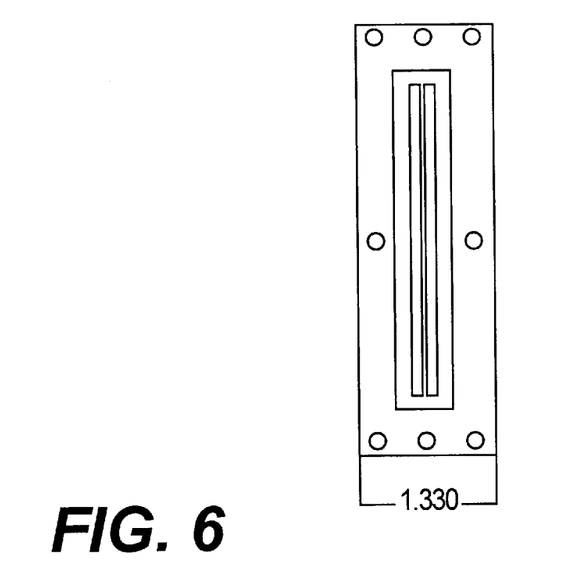
FIG. 6 is a top view of another embodiment of a sensor of the present invention as housed for installation.

In one preferred embodiment of the present invention, the housing 30 of the sensor as illustrated in FIG. 1 is configured as illustrated in FIG. 5(A-B) to facilitate insertion into a circular opening provided in an aerodynamic or control surface of the aircraft. Such a circular opening may be easily made in an existing surface allowing simple installation in aircraft already in service. The housing 30 may be easily attached to the surface to be monitored through the use of screws, rivets or the like. However, any suitable method of mounting, including adhesive or welding, may be utilized. FIG. 6 illustrates an alternative configuration of the housing 30 wherein the housing is rectangular.

DESCRIPTION OF OPERATION

The radio frequency technique of the present application is based on a novel method of precisely measuring the dielectric coefficient of a substance through the use of a surface gap transmission line. The surface gap transmission line of the type described in the present specification emits an electric field which is reflected by the conducting plane 19 and thus extends upwardly from the transmission line surface into the area between and immediately above the first and second transmission line electrodes 20, 22. When an electromagnetic radio frequency is propagated down the transmission line, its velocity varies with the dielectric constant of the material surrounding the transmission line. Depending on frequency, the dielectric constant of air is slightly greater than $1^4$ while the dielectric constants of various glycols range around 25–30. The dielectric concept of rain water, depending on frequency, is in the range of 78 to 88 while the dielectric constant of ice is about 4.

The dielectric constant of the material surrounding the slot-type transmission line affects the propagation time of a signal along the transmission line. Specifically, the relationship between propagation travel time and dielectric constant is $V=\sqrt{(I \cdot C)}$ where I is the inductance in Henrys/meter and C is the capacitance in Farads/meter. Since capacitance in a transmission line is proportional to its dielectric constant, both propagation velocity and phase shift in a transmission line are proportional to the square root of the dielectric constant. This is the basic physical principle underlying the sensor produced according to the teachings of the present application.

According to the teachings of the present application, given a constant length transmission line, the phase delay through the transmission line will be proportional to the square root of the dielectric coefficient. Accordingly, through measurement of the phase delay within the transmission line, the dielectric constant of the material may be determined. Generally, differing dielectric constants input into a software algorithm developed by anyone of ordinary skill are sufficient to make a positive identification of the substance. In the preferred embodiment, temperature data is also used to make an unambiguous identification of the substance overlying the sensor face.

[4] The dielectric constant of a vacuum is actually 1.0.

Accordingly, with reference to FIG. 1, the sensor processor 32 produces a radio frequency emission which is provided to the first end 14 of the slot-type transmission line 12 via a first conductor 36. The output of the transmission line 12 is supplied to the phase detector 34 via an output line 38 connected to a second end 16 of the slot-type transmission line 12. The phase detector 34 determines the phase delay created by the transmission line. Since the length of the transmission line is known, the processor can calculate velocity along the transmission line from phase delay and accordingly use Equation 1 above to determine dielectric constant.

In one preferred embodiment of the present application, the system of the present application eliminates environmental variations caused by temperature, humidity and the like through the use of a second slot-type transmission line or references sensor 212 which is physically substantially identical to the primary sensor 22 comprising the slot-type transmission line 12. The reference sensor 212 is provided in a protected environment isolated from the surface to be monitored or substance to be measured, thereby ensuring that temperature drifts or humidity drift within the circuitry of the FIG. 3 embodiment will be eliminated from the phase delay measurement.

The system of the present application desirably utilizes varying radio frequencies to monitor phase shift. This is because the dielectric coefficients of many materials vary with frequency. For example, while the dielectric coefficient of water is relatively stable, the dielectric coefficient of ethylene glycol can vary a great deal over frequency. Accordingly, the slope of the dielectric coefficient measured by the sensor produced according to the teachings of the present invention will vary as a function of frequency, which variation is used to estimate the relative concentrations of a binary dielectric (for example, ice and water or water and deicing fluid). Accordingly, the slope of the dielectric coefficient as a function of frequency provides useful information as to the relationship of ice and water or water and deicing fluid.

The system of the present application is further able to predict when icing will occur based upon the measurement of temperature and the rate of change of the measurement of dielectric coefficient of the substance being sensed. An estimate of the relative concentration of a freezing point depressing fluid such as ethylene glycol and water is calculated from the dielectric sensed and the slope of the dielectric coefficient as a function of frequency. For example, if the dielectric constant of the substance to be measured is substantially equal to the expected dielectric constant of the FPD fluid, the primary constituent of the substance to be measured is the FPD fluid. If the surface bathed in FPD fluids is exposed to precipitation, the ratio of dielectric contact measured by the sensor and the dielectric constant of liquid water will, over time, approach unity. The value of this ratio is an accurate estimate of FPD fluid concentration. By calculating the relative concentration of freezing point depressing fluid, an estimate of the time until icing will occur may be made. This estimate may also be made or enhanced through the determination of the time rate of change of the dielectric constant as the dielectric constant transitions from a water/freezing point depressing fluid mixture to an iced condition.

According to the teachings of the present application, a system may utilize a single frequency, multi-frequencies or may apply a swept frequency to the transmission line, as optimally selected for detection and discrimination of the substance in question. In one embodiment of the present invention, to facilitate detection discrimination of water, ice and ethylene glycol, applicants utilize two frequencies optimally chosen for detection and identification of these substances, one at about 450 MHz and the other at about 1 GHz. By examining the dielectric values measured at these different frequencies, water, ice and glycol may be easily distinguished as is apparent from an examination of FIG. 8, which shows the dielectric measured for various substances as a function of applied radio frequency.

Figure 8:
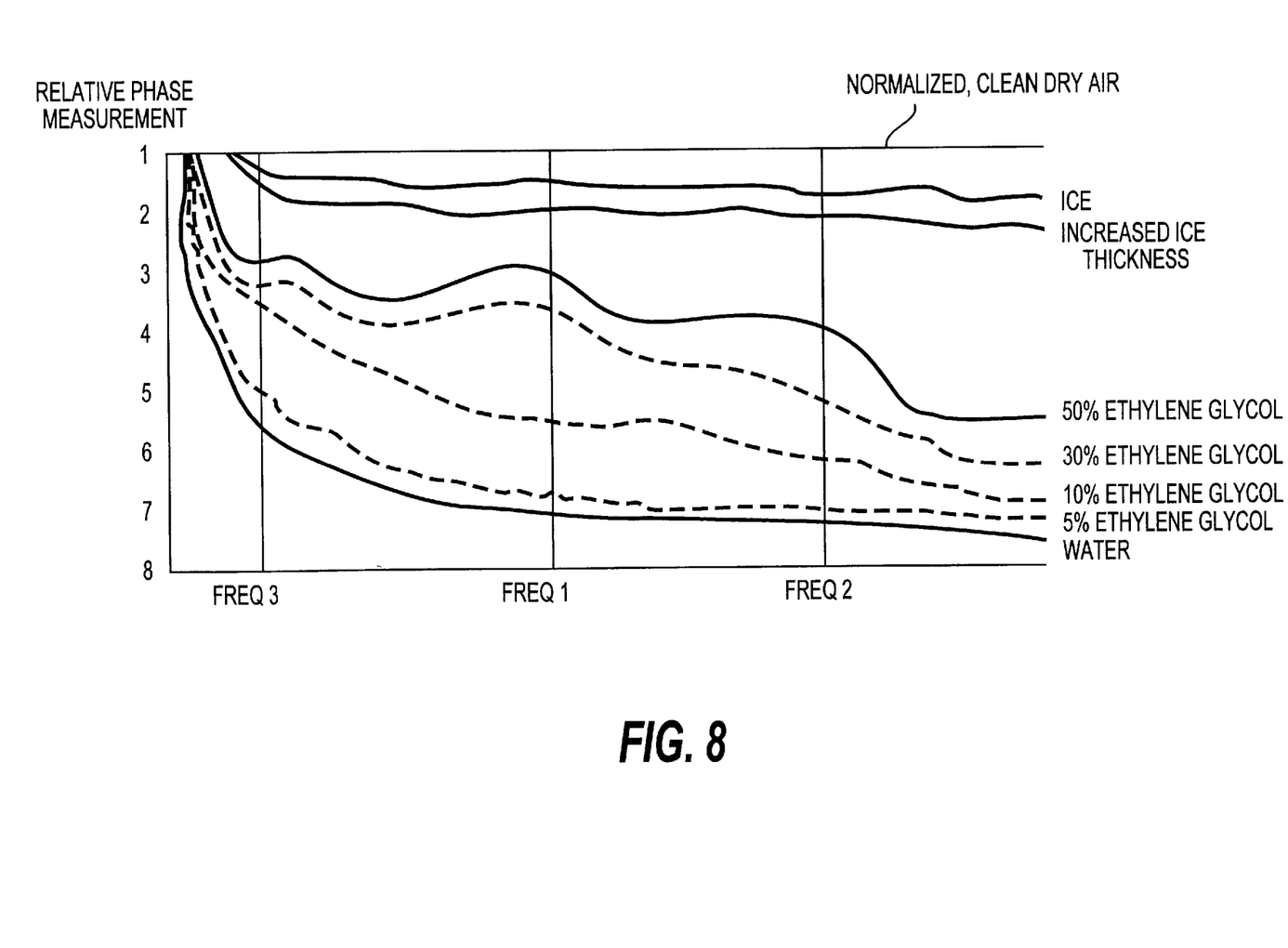
FIG. 8 is a graphical illustration of empirical measurements obtained illustrating the phase shift caused by various substances as function of transmitted radio frequency in accordance with the teachings of the present application.

Note for example FIG. 8, illustrating the differing dielectric constants of ice, an increased thickness of ice, liquid water and various solutions of ethylene glycol (a commonly used FPD fluid), as compared to the dielectric measurement of dry, clean air normalized to unity. When liquid water is applied to the sensor face an immediate change in phase (and hence dielectric constant) is measured by the sensor. The phase change is due to a change in the velocity of propagation of the RF energy in the balanced transmission line sensor gap. In this example, the measurements are made over 3 radio frequencies, but this in no way limits the scope of the current invention, what may utilize one or more discrete RF frequencies, or an analog sweep of frequencies to accomplish identification of the substance in question, as may be optimal for the particular material involved.

In this example, phase measurements are summarized by Table 1:

TABLE 1

| Frequency | Time | Measurement ($\phi$) |
|---|---|---|
| 1 | $T_0$ | 7.0 |
| 2 | $T_0$ | 7.25 |
| 3 | $T_0$ | 5.5 |

These measurements and the temperature measured by the sensors are compared to preloaded measurements of the dielectric coefficient of liquid water at varying temperatures providing a positive identification of liquid water on the sensor face.

In freezing temperatures, the liquid water present on the sensor face changes state to ice which is accompanied by a substantial change in measured phase reflecting a change in dielectric from about 88 for water to about 4 for ice. This is illustrated in Table 2:

TABLE 2

| Frequency | Time | Measurement ($\phi$) |
|---|---|---|
| 1 | $T_1$ | 1.5 |
| 2 | $T_1$ | 1.65 |
| 3 | $T_1$ | 0.25 |

As before, using an algorithm easily written by one of ordinary skill in programming, these phase measurements at time $T_1$ are compared to measurements indicative of a variety of potential substances likely to be encountered on the sensor surface stored in the sensor memory. When the phase measurement corresponds that for thin ice, a positive identification of ice is made. The software algorithm takes into account small variations between theoretical and actual measurements which may be caused by impurities in the water, air bubbles or the like using techniques known to one of ordinary skill in the art of software design as "fuzzy logic".

Figure 7:
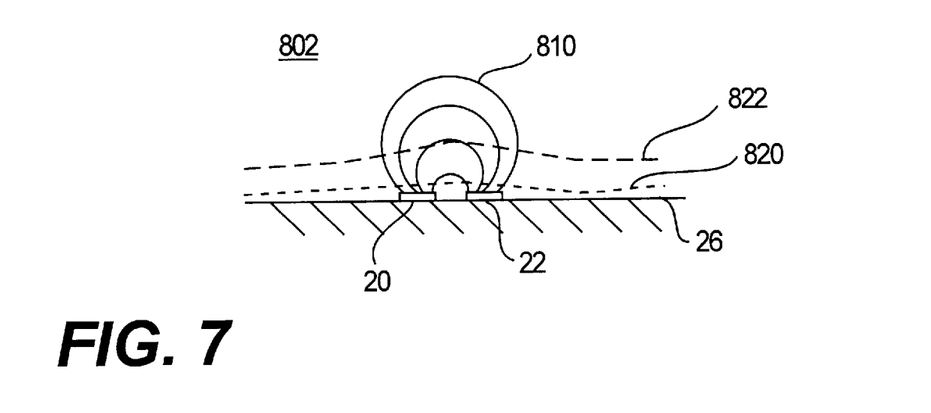
FIG. 7 is a schematic illustration of the E field developed by the sensor of the present application and the effect of varying ice layer thicknesses thereon.

Between the interval $T_1$ and $T_2$ ice continues to build up on the sensor face. Variations in ice thickness is also inferred by measuring transmission line phase shift. The phase shift measured by the sensor is a composition function of the total transmission line dielectric-consistency of air, including supporting structures (if any) and the test sample (water, ice, etc.). As shown in FIG. 7, the transmission line E field 810 extends into the dielectric from the first and second transmission line electrodes 20, 22 and is affected by the dielectric as a result.

As illustrated in FIG. 7, the resulting phase shift measured by the sensor is a function of the extent of the combination of the ice coat and the air 802. For example, a thin ice coat 820 causes the E field 810 to extend into the air 802 to a greater extent while a thicker ice coat 822 reduces the amount of air 802 that the E field 810 extends into. Thus it can be seen that the dielectric constant is affected by ice thickness. There is a practical limit to the thickness of materials that can be measured by this technique; it is the effective height of the transmission E field. The E field height can be adjusted, within limits, by increasing the line impedance (i.e., going to a wider conductor spacing) and by lowering the test frequency. In Table 3 the phase measurements at time $T_2$ are summarized:

TABLE 3

| Frequency | Time | Measurement ($\phi$) |
|---|---|---|
| 1 | $T_2$ | 2.0 |
| 2 | $T_2$ | 2.25 |
| 3 | $T_2$ | 0.45 |

These phase values are compared with prestored data to infer that, in one preferred embodiment, accumulated ice build up has achieved a thickness of about 75% of E field height, corresponding to an ice thickness of 0.25"

At time $T_3$ a freezing point depressing fluid consisting of 50% solution of ethylene glycol is applied to the sensor face. The application of the FPD fluid occasions an immediate state change from ice to water, with a dilution of the 50% glycol solution to 30% glycol. An immediate phase change is detected by the sensor, which is summarized in Table 4:

TABLE 4

| Frequency | Time | Measurement ($\phi$) |
|---|---|---|
| 1 | $T_3$ | 3.7 |
| 2 | $T_3$ | 5.2 |
| 3 | $T_3$ | 3.1 |

The software algorithm compares the data taken at time $T_3$ with prestored phase versus frequency function of various materials at various temperatures. An identification of glycol solution is made.

As additional precipitation falls on the face of the sensor, the solution of FPD fluid is further diluted. As the solution becomes diluted, the dielectric measurement tends towards the values for pure water. This is illustrated in Table 5:

TABLE 5

| Frequency | Time | Measurement ($\phi$) |
|---|---|---|
| 1 | $T_4$ | 5.5 |
| 2 | $T_4$ | 6.1 |
| 3 | $T_4$ | 3.5 |

The rate of change of dilution can be readily computed, which together with temperature, is used to provide an estimate of how much longer there will be sufficient FPD fluid in solution on the sensor to prevent ice formation. For example, at $-5°$ C., ice formation will occur in 5 seconds for pure water, 10 seconds for 5% glycol solution, and 60 seconds for 10% glycol solution.

At time $T_5$ another phase measurement is taken. Precipitation has further diluted the glycol solution, as illustrated in Table 6:

TABLE 6

| Frequency | $\phi T_0$ | $\phi T_3$ | $\phi T_3 / \phi T_0$ | $\phi T_4$ | $\phi T_4 / \phi T_0$ |
|---|---|---|---|---|---|
| 1 | 7.0 | 3.7 | .53 | 5.5 | .78 |
| 2 | 2.25 | 5.2 | .72 | 6.1 | .84 |
| 3 | 5.5 | 3.1 | .56 | 3.5 | .64 |

The value of $\phi T_4 / \phi T_0$ is used to indicate that the ratio of FPD fluid to water is sufficiently diluted that ice formation is likely to occur unless additional FPD fluid is applied. Based on the rate of dilution, measured by the changes in the ratio of the current phase measurement to the dielectric contact of water, an estimate of time before additional deicing is required (i.e., time before ice formation) is computed. The computation is readily understood by one of ordinary skill in the art. Unless additional FPD fluid is applied a state change will occur. This state change will be evidenced by changes in dilution constant (i.e., phase measurements) from those substantially equal to liquid water, to those associated with ice. This is illustrated in Table 7:

TABLE 7

| Frequency | $\phi\ T_4$ | $\phi\ T_5$ | |
|---|---|---|---|
| 1 | 5.5 | 1.5 | $T_5$ |
| 2 | 6.1 | 1.65 | $T_5$ |
| 3 | 3.5 | 0.25 | $T_5$ |

This example also illustrates the value in making multiple frequency measurements. With multiple data points a ø-frequency function is developed, which in turn is compared to a ø-frequency function stored in memory. The accuracy of substance identification and the corresponding alert to the flight crew is a function of the value of points of congruence between the action ø measurements and the analytic function describing the underlying phenomena of phase versus frequency change for various substances of interest. The ability to make measurements over multiple RF frequencies, or a frequency band, provides information not available to other ice sensors. The ability to measure phase slope as a function of frequency is an especially strong indication of ice, water and other wing contaminants.

It should be apparent that for differing substances it is possible to utilize differing frequencies, transmission line length and transmission line characteristics to perform a variety of substance identification functions. For example, an embodiment of the present invention could be used to test for pollutants such as petro-chemicals, glycols or other industrial chemicals and solvents in aquifers and other naturally occurring marine environments. In addition, one of ordinary skill in the art could modify the sensor to optimize sensitivity for detection of the metabolic byproducts of bacterial organisms in water treatment plants.

The sensor could be readily configured to provide closed loop feedback of purity in a variety of industrial processes, such as that employed in the petrochemical and plastics industry.

Further, the sensor could be used to measure thickness of materials, such as plastics, ceramics and silicon wafers according to the teaching herein (re: E-field height) to accuracy of about 1%.

The icing sensor utilized in the present invention is, in one preferred embodiment, intended to be used to sense icing on aircraft control surfaces. However, the icing sensor of the present application may be employed for a variety of uses. For example, icing sensors might be employed on highway bridges and coupled to a display to announce to motorists icing conditions. An icing sensor may also be manufactured without an underlying substrate or support surface, the transmission line being exposed directly to the atmosphere and used, for example, for the sensing of ice build-up on transmission lines or the like and to report automatically to utility companies for dispatch of a service crew. It should be apparent that a variety of uses may be developed for the sensor produced according to the teachings of the present application and as embodied in the appended claims.

It is apparent from the foregoing description that the icing and substance sensing device of the present invention has wide utility in the detection of icing or other substances where dielectric constant is detected. Applicants developed a new system for monitoring these changes based upon dielectric produced transmission line phase delays. Applicants' invention has wide utility and should not be limited by the foregoing examples, the spirit and scope of the invention being defined solely by the appended claims.

We claim:

1. A method of detecting the presence of icing on a surface comprising:
   a) developing a radio frequency;
   b) transmitting the radio frequency down a surface mounted surface gap transmission line;
   c) receiving the transmitted radio frequency after transmission along said surface mounted surface gap transmission line;
   d) measuring the propagation delay of said radio frequency received from said surface mounted surface gap transmission line in said step b) of transmitting; and
   determining the presence of icing from a parameter directly related to the propagation delay measured in step d).

2. The method of claim 1 wherein water has a dielectric constant which varies with its state, the time of propagation measured in said step d) varying according to the dielectric constant of the substance present on the surface.

3. The method of claim 1 wherein said radio frequency is in the range of $10^6$ to $10^{10}$ Hz.

4. The method of claim 3 wherein said radio frequency is in the range of $10^9$ Hz.

5. The method of claim 1 wherein said step d) of measuring measures the phase delay between the radio frequency transmitted in said step b) and the radio frequency received in said step c) to determine the presence of icing based on propagation delay.

6. The method of claim 5 wherein the dielectric constant of water at the radio frequency used in said step b) of transmitting is substantially different from the dielectric constant of ice at the radio frequency.

7. The method of claim 6 wherein the dielectric constants of any freezing point depressing fluids used to perform deicing of the surface are substantially different from the dielectric constant of ice and water;
   said step e) of determining thereby distinguishing ice and water from any freezing point depressing fluids.

8. The method of claim 5 wherein the surface gap of said surface gap transmission line is a sensing area, said method detecting the presence of icing at said sensing area.

9. The method of claim 8 wherein said step e) of determining includes,
   i) monitoring the time rate of change of said phase delay to thereby determine the time rate of change of the dielectric constant of a material at said sensing area,
   ii) predicting from said time rate of change the expected time before icing will occur.

10. The method of claim 9 further comprising:
    f) providing a temperature sensor and sensing the temperature of said surface therewith;
    said step e) of determining the presence and relative concentration of any freezing point depressing fluids based on determined dielectric constant;
    said step e) of determining further determining the expected time for icing to occur based on temperature measured in said step f) of measuring, the relative concentration of any freezing point depressing fluid and the time rate of change of the dielectric constant.

11. The method of claim 1 wherein said step b) of transmitting supplies the transmitted radio frequency at a first end of said surface mounted surface gap transmission line; said step c) of receiving receiving said transmitted radio frequency from a second end of said surface mounted surface gap transmission line.

12. The method of claim 11 wherein said method further includes,
f) providing a reference surface gap transmission line substantially identical to the surface mounted surface gap transmission line of said step b) but protected from exposure from weather conditions,
said step b) of transmitting said radio frequency to first ends of both said surface gap transmission lines;
said step c) of receiving said transmitted radio frequency from both said surface gap transmission lines;
said step d) measuring the difference in the time of propagation between said reference surface gap transmission line and said surface mounted surface gap transmission line;
said step e) determining the presence of icing based on the difference between the time of propagation of along said reference surface gap transmission line and said surface mounted surface gap transmission line.

13. The method of claim 1 wherein an audible announcement of the presence of ice is provided the operator.

14. A method of deicing an aircraft surface comprising:
a) providing a surface gap transmission line sensor on the aircraft surface;
b) using the surface gap transmission line sensor to detect the presence of ice based upon a measurement dependent on the dielectric constant of material on the surface measured by said sensor;
c) using a freezing point depressing fluid having a dielectric constant substantially different from the dielectric constant of ice to remove/inhibit ice until said surface gap transmission line sensor indicates that ice is no longer present.

15. The method of claim 14 wherein said step b) of using includes the steps of,
i) developing a radio frequency;
ii) transmitting the radio frequency down a surface mounted surface gap transmission line;
iii) receiving the transmitted radio frequency after transmission along said surface mounted surface gap transmission line;
iv) measuring the propagation delay of said radio frequency down said surface mounted surface gap transmission line;
v) determining the presence of icing from a parameter directly related to the propagation delay measured in step d).

16. The method of claim 14 wherein said step, i) of measuring measures the phase delay between the radio frequency transmitted in said step ii) and the radio frequency received in said step iii) to determine the presence of icing based on propagation relay.

17. The method of claim 16 wherein the surface gap of said surface gap transmission line is a sensing area, said method detecting the presence of icing at said sensing area.

18. The method of claim 17 wherein said step v) of determining includes,
i) monitoring the time rate of change of said phase delay to thereby determine the time rate of change of the dielectric constant of a material at said sensing area,
ii) predicting from said time rate of change the expected time before icing will occur.

19. The method of claim 18 further comprising:
f) providing a temperature sensor and sensing the temperature of said surface therewith;
said step v) of determining the presence and relative concentration of any freezing point depressing fluids based on determined dielectric constant;
said step v) of determining further determining the expected time for icing to occur based on temperature measured in said step iv) of measuring, the relative concentration of any freezing point depressing fluid and the time rate of change of the dielectric constant.

20. The method of claim 15 wherein said step ii) of transmitting supplies the transmitted radio frequency at a first end of said surface mounted surface gap transmission line;
said step iii) of receiving said transmitted radio frequency from a second end of said surface mounted surface gap transmission line.

21. A system for detecting the presence of icing on a surface comprising:
a surface mounted surface gap transmission line;
a radio frequency source, operatively connected to said surface mounted surface gap transmission line, and supplying a radio frequency thereto;
a detector, operatively connected to said surface mounted surface gap transmission line, and detecting the propagation delay of said radio frequency along said surface mounted surface gap transmission line; and
means for determining the presence of icing from the propagation delay detected by said detector.

22. The system of claim 21 wherein water has a dielectric constant which varies with its state, propagation delay detected by said detector varying according to the dielectric constant of the substance present on the surface.

23. The system of claim 21 wherein said radio frequency is in the range of $10^6$ to $10^{10}$ Hz.

24. The system of claim 23 wherein said radio frequency is in the range of $10^9$ Hz.

25. The system of claim 21 wherein said surface mounted surface gap transmission line has first and second ends;
said radio frequency source being operatively connected to the first end of said surface mounted surface gap transmission line;
said detector being operatively connected to the second end of said surface mounted surface gap transmission line.

26. The system of claim 25 wherein said detector measures the phase delay between the radio frequency provided the first end of said surface mounted surface gap transmission line and the radio frequency received at the second end of said surface mounted surface gap transmission line to determine the presence of icing.

27. The system of claim 26 wherein the dielectric constant of water at the radio frequency of said radio frequency transmitter is substantially different from the dielectric constant of ice at the radio frequency.

28. The system of claim 27 wherein the dielectric constants of any freezing point depressing fluids used to perform deicing of the surface are substantially different from the dielectric constant of ice;
said means for determining thereby distinguishing ice from any freezing point depressing fluids is substantially different from the dielectric constants of any freezing point depressing fluids used to perform deicing of the surface.

29. The system of claim 26 wherein the surface gap of said surface gap transmission line is a sensing area, said surface gap transmission line sensing the presence of icing at said sensing area.

30. The system of claim 29 wherein said means for determining includes, means for monitoring the time rate of change of said phase delay detected by said detector to thereby determine the time rate of change of the dielectric constant of a material at said sensing area, means for predicting from said time rate of change the expected time before icing will occur.

31. The system of claim 30 further comprising:

a temperature sensor sensing the temperature of said surface;

said means for determining the presence and relative concentration of any freezing point depressing fluids based on determined dielectric constant;

said means for determining further determining the expected time for icing to occur based on temperature measured by said temperature sensor, the relative concentration of any freezing point depressing fluid and the time rate of change of the dielectric constant.

32. The system of claim 26 wherein said system further comprises:

a reference surface gap transmission line substantially identical to the surface mounted surface gap transmission line but protected from exposure from weather conditions, said radio frequency source supplying said radio frequency to first ends of both said surface gap transmission lines;

said detector receiving said transmitted radio frequency from both said surface gap transmission lines and determining the phase delay therebetween to determine the presence of icing.

33. The system of claim 21 further comprising an annunciator audibly announcing to the operator the presence of ice.

34. An icing detection system for detecting the presence of icing on a surface comprising:

a surface mounted surface gap transmission line;

a radio frequency source connected to said surface mounted surface gap transmission line;

a phase detector, connected to said surface mounted surface gap transmission line and to said energy source, and detecting a phase difference between the radio frequency provided by said source and the radio frequency propagated along said surface mounted surface gap transmission line; and an icing detector, responsive to said phase difference detected by said phase detector, and determining the presence of icing based on said phase difference.

35. The icing detection system of claim 34, wherein said transmission line is a micro-strip transmission line.

36. The icing detection system of claim 34, wherein said icing detector is also a substance determiner, determining a substance surrounding said micro-strip transmission line based on the phase difference detected by said phase detector to determine the presence of icing.

37. The system of claim 34 wherein said surface mounted surface gap transmission line has first and second ends;

said radio frequency source being operatively connected to the first end of said surface mounted surface gap transmission line;

said phase detector being operatively connected to the second end of said surface mounted surface gap transmission line.

38. A method of identifying a substance comprising:

a) disposing a surface gap transmission line in contact with said substance;

b) developing a radio frequency;

c) transmitting the radio frequency down an surface mounted surface gap transmission line d) receiving the radio frequency after transmission along said surface gap transmission line;

e) measuring the propagation delay of said radio frequency down said surface gap transmission line;

f) determining the identity of the substance from the time of propagation measured in step e).

39. The method of claim 38 wherein said substance has a dielectric constant which varies from other substances;

the time of propagation measured by said step e) of measuring varying in substantial proportion to the dielectric constant of the substance.

40. The method of claim 38 wherein said step c) of transmitting supplies the transmitted radio frequency at a first end of said surface mounted surface gap transmission line;

said step d) of receiving receiving said transmitted radio frequency from a second end of said surface mounted surface gap transmission line.

* * * * *